United States Patent [19]

Stanley

[11] Patent Number: 5,870,852
[45] Date of Patent: Feb. 16, 1999

[54] NON-TOXIC FIRE ANT EXTERMINATION MEANS

[76] Inventor: William Ralph Stanley, 1312 Phillips Ave., New Bern, N.C. 28562

[21] Appl. No.: 743,038

[22] Filed: Nov. 4, 1996

Related U.S. Application Data

[60] Provisional application No. 60/010,563 Jan. 25, 1996.
[51] Int. Cl. [6] .......................... A01M 17/00; A01M 19/00
[52] U.S. Cl. ............................... 43/130; 43/132.1; 111/7.1
[58] Field of Search .............................. 43/124, 129, 130, 43/132.1, 900; 451/90; 111/7.1, 7.2, 7.3, 7.4, 118

[56] References Cited

U.S. PATENT DOCUMENTS

| | | | |
|---|---|---|---|
| 2,222,235 | 11/1940 | Nelson | 111/7.3 |
| 2,306,165 | 12/1942 | Irish | 111/7.1 |
| 2,379,160 | 6/1945 | Kennison | 111/7.4 |
| 2,885,121 | 5/1959 | Littleton | 111/7.3 |
| 2,906,056 | 9/1959 | Youngblood . | |
| 3,399,639 | 9/1968 | Enblom | 111/7.4 |
| 3,753,408 | 8/1973 | Zimmerman | 111/7.1 |
| 3,886,874 | 6/1975 | Platz | 111/7.4 |
| 4,637,161 | 1/1987 | Turner | 43/132.1 |
| 4,756,118 | 7/1988 | Evans, II . | |
| 4,768,306 | 9/1988 | Hilbun . | |
| 4,817,329 | 4/1989 | Forbes . | |
| 5,031,355 | 7/1991 | Ryan . | |
| 5,054,231 | 10/1991 | Witherspoon . | |
| 5,319,878 | 6/1994 | Moffet et al. | 43/132.1 |
| 5,325,626 | 7/1994 | Jackson . | |
| 5,430,970 | 7/1995 | Thompson et al. . | |

*Primary Examiner*—Jack W. Lavinder
*Attorney, Agent, or Firm*—Mills Law Firm PLLC

[57] ABSTRACT

A non-toxic fire ant extermination system providing probe injection of scalding water below ground level within a fire ant mound is disclosed. The system includes a propane fueled water heater and water circulating pump capable of heating water in the range of 200 to 210 degrees Fahrenheit and of delivering the same at a flow rate of least three gallons per minute which is effective to eradicate the insects within the core region of a fire ant mound. The injection probe features a cylindrical capture shield which is radially disposed about the probe and adapted for sliding attachment therewith being spring-biased in a downward direction against the surface of the ground during operation thereof to retain the intense heat generated by the process,to capture fire ants emerging from the mound, and to protect the operator from the backflow of scalding water as the treatment proceeds. The injection probe is inserted below ground level and a continuous flow of scalding water is introduced into the mound as the probe is inserted further and slowly withdrawn until the hot water has penetrated throughout the core region of the mound complex. The fire ant extermination system is adaptable for use with any natural source of fresh water by use of a suitable filter system. In the alternative the system is adaptable to any municipal water supply having adequate water pressure in the range of 40 to 60 pounds per square inch.

9 Claims, 5 Drawing Sheets

NON-TOXIC FIRE ANT EXTERMINATION MEANS

CLAIM OF BENEFIT OF PROVISIONAL APPLICATION

This application claims the benefit of U.S. Provisional Application No. 60/010,563 filed on Jan. 25, 1996, by William R. Stanley for Non-Toxic Fire Ant Extermination Means.

BACKGROUND OF INVENTION

This invention relates to the extermination of fire ants and, more particularly, to a method and apparatus for treating the same.

Since the importation of the fire ant to this country in the early 1900's, perhaps on shiploads of lumber imported from the insect's home territory in South America, more than 300 million acres of cropland, lawns, recreation areas and other valuable property throughout the entire southern portion of the United States have been infested with many millions of acres being rendered useless.

The United States Department of Agriculture estimates an annual yearly loss to agriculture of several billions of dollars because the imported fire ants consume an extraordinary amount of agriculture products such as soybeans, citris fruit and trees, and potatoes.

Fire ants attack any living thing that invades their established territory surrounding their raised nesting mounds and are known to kill and eat chickens, calves and piglets. In some areas the rapidly spreading ants are crowding out (or killing) other insects, lizards, birds, and small mammals completely destroying natural ecosystems.

The use of chemical pesticides and poison baits to eradicate the insects has raised environmental concerns and resulted in a government ban against chemical treatment of fire ants by conventional methods. The primary problem with pesticides and other poisons is that they not only kill their targets but also most other wildlife including those species of ants and other insects which help to keep the population of the fire ants under control.

Thus, the present invention provides a solution to these problems by utilizing an effective environmentally safe, non-toxic treatment for fire ant control.

DESCRIPTION OF RELATED PRIOR ART

U.S. Pat. No. 5,319,878 to Daniel Moffett, et. al. discloses a method and apparatus for e,(termination of imported fire ants accomplished by a process in which water, heated to a temperature in the range of 200°–212° Fahrenheit, is applied by impulse inundation within the central core region of a fire ant mound initiated below ground level, and thereafter continuing as a probe is inserted and withdrawn repeating the process at different angles and orientations.

U.S. Pat. No. 5,031,355 to Dennis H. Ryan discloses a steam arrangement for exterminating the Argentina Fire Ant including a holding and pressure tank, a heat exchanger in fluid communication with the holding and pressure tank, a super heater in fluid communication with the heat exchanger, and a dome in fluid communication with the super heater, which is disposed about the fire ant mound.

U.S. Pat. No. 4,637,161 to Loren J. Ttnier discloses an apparatus for underground insect and animal extermination including a tubular ground probe for downward penetration into an underground habitat of the insects or animals and the upper end of the probe being provided with inlet means for steam under pressure.

U.S. Pat. No. 2,906,056 to Ulysse H. Youngblood discloses an exterminating device and system for applying exterminating material in a colony of insects and which is constructed to allow use of a different distributing pressure for spraying material over the area adjacent to the colony than is required for injecting it into the soil where the colony has settled.

U.S. Pat. No. 4,756,118 to Charles W. Evans, II, discloses the method and apparatus for the destruction of imported fire ants by the introduction of intense heat, vapor, insecticides and/or steam directly into the colony thereby incorporating the use and application of specific chemical compounds and/or vaporizing liquids injected into the ant colonies by various methods including a pressurizing injection gun.

U.S. Pat. No. 5,325,626 to Robert L. Jackson discloses a fire ant pesticide dispenser apparatus including a reservoir for the introduction of liquid insecticide, a conduit that transports liquid insecticide from the reservoir to a dispersion manifold, and a pointed tip to facilitate putting the device into the ground.

U.S. Pat. No. 4,768,306 to Steve Hilbun discloses a method and system for killing fire ants in a mound comprising a shroud which will fit over the mound and conform to the contour of the ground. The shroud is provided with a relief valve, a tube or hose for admitting an automotive exhaust gas into the shroud and a handle for lifting the device.

U.S. Pat. No. 5,054,231 to Phynus R. Witherspoon discloses a fire ant eradication apparatus and method including connecting a supply of pressurized water to a dispenser handle, forcing water or a water and insecticide mixture out a vertical probe to drench the top of the fire ant mound, and slowly inserting the probe into the fire ant mound with the water or water and insecticide mixture flowing.

U.S. Pat. No. 4,817,329 to Charles Forbes discloses a method of extermination of insects by heat in which gases are directed on to the ant structure to heat the structure itself to a temperature that is lethal to the insects, and maintaining that temperature long enough to kill the insects.

Finally, U.S. Pat. No. 5,430,970 to James E. Thompson, et al. is considered of general interest in that it discloses the use of hot water to kill vegetation such as weed and undergrowth. The apparatus is characterized by its construction including an endless, ground-engaging belt disposed immediately aft of the hot water spray.

SUMMARY OF INVENTION

After much research and study into the eradication of imported fire ants, the present invention has been developed to provide an environmentally safe apparatus for the injection of scalding water within the lowermost core region of a fire ant mound, and thereafter continuing as the probe is withdrawn, and repeating the process as often as necessary to eradicate the insects.

The fire ant extermination system of the present invention includes a hot water heater unit comprised of a pre-heater and a super heater, a circulating pump, an elongated probe for the injection of the scalding water into the fire ant mound, a power supply, and the necessary water, fuel, and electrical lines to interconnect the components of the system. The system is portable and adapted for mounting on a truck, trailer or other suitable conveyance.

The fire ant extermination system is designed for use with any convenient natural source of fresh water when a suitable filter is utilized. In an alternative embodiment, the system is adapted to be attached to any municipal water supply that finishes pressurized water in the range of 40 to 60 psi, which is typical for ordinary residential use.

In view of the above, it is an object of the present invention to provide an environmentally-safe fire ant extermination system which is capable of injecting scalding water in the optimum range of 200° to 210° Fahrenheit into the core region of a fire ant mound below ground level.

Another object of the present invention is to provide a portable fire ant extermination system including a hot water heating unit, a water circulating pump, an elongated probe for the injection of scalding water into the fire ant mound below ground level, and power and fuel sources.

Another object of the present invention is to provide a portable fire ant extermination system capable of being mounted on a truck, trailer, or other suitable conveyance for transport to a remote location.

Another object of the present invention is to provide a fire ant extermination system that is adapted for direct attachment to a conventional water supply such as a municipal system that furnishes pressurized water in the range of 40 to 60 psi., which is typical for ordinary residential use.

Another object of the present invention is to provide a fire ant extermination system that is adapted for use with virtually any natural source of water such as a lake, pond, or stream by means of a filtration system.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
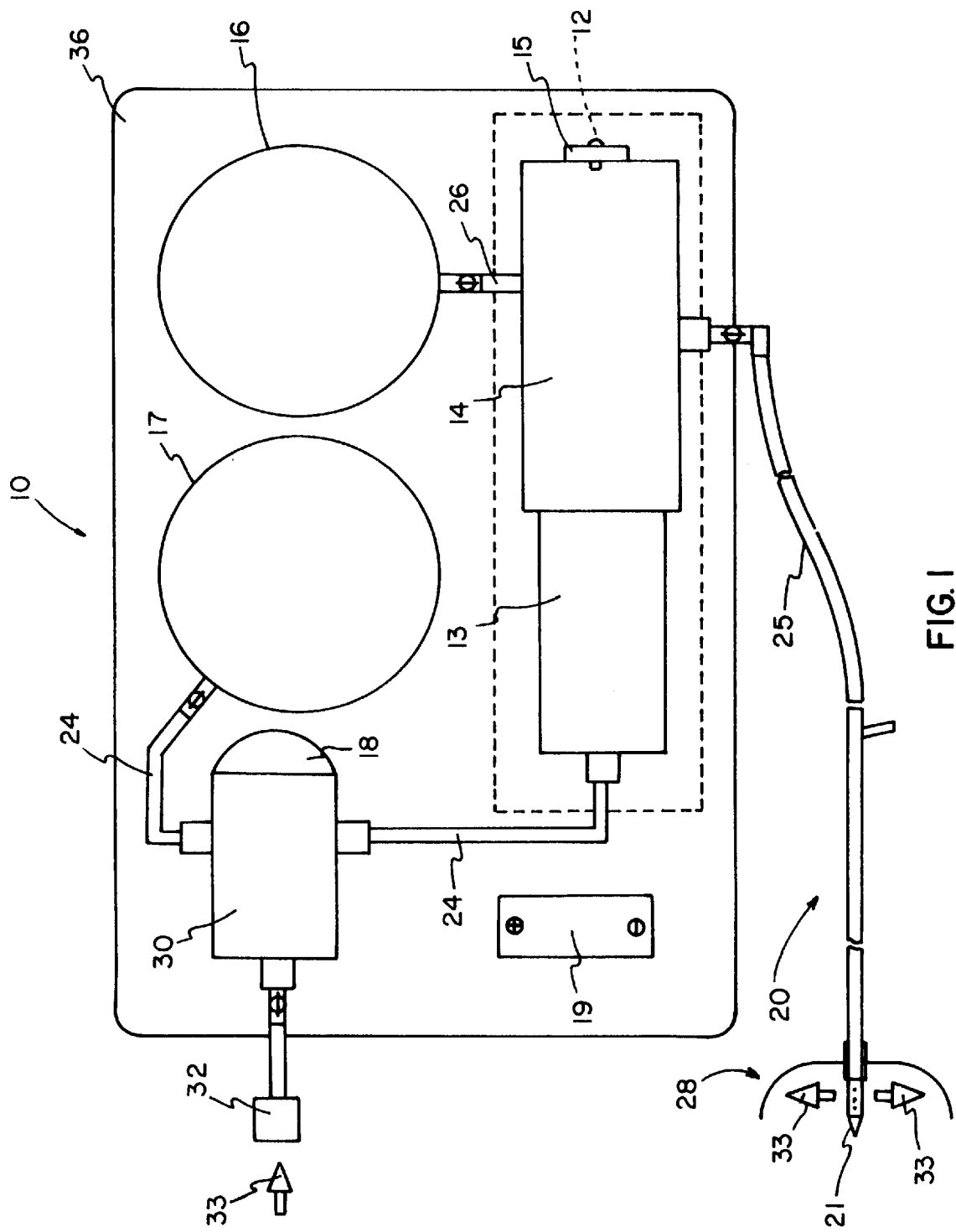
FIG. 1 is a schematic representation showing the layout of the fire ant extermination system of the present invention and the components thereof.

With reference to the drawings, a fire ant extermination system in accordance with the present invention is illustrated schematically in FIG. 1, indicated generally at 10

In the preferred embodiment, the fire ant extermination on system 10 comprises the following major components: a hot water heater indicated generally at 12; a propane gas tank 16 for supplying fuel thereto; a water circulating pump 30 mechanically coupled to a motor 18 for delivery of water to the heater 12; an elongated, tubular probe, indicated generally at 20, for the injection of scalding water into the fire ant mound, a reserve water tank 17; a power supply 19; and water lines 24 and fuel supply lines 26 interconnecting the components.

In practical use the hot water heater 20, the propane gas tank 16, and the motor 18 and water circulating pump 30 may be mounted in balanced relation on a suitable pallet 36 or other platform which may be readily transported in the bed of a pickup truck (not shown). Alternatively, the pallet 36 mounted system 10 may be installed in a trailer, a hand truck or other suitable conveyance as desired.

As a portable unit, the fire ant exterminating system 10 is adapted for use with virtually any convenient source of water such as a lake, pond, or stream by means of a suitable filter 32 installed in the water inlet indicated by directional arrow 33.

In an alternative embodiment, the motor 18 and water circulating pump 30 may be bypassed and the hot water heater 12 may be attached directly to any conventional, potable water supply such as municipal or well system that furnishes pressurized water in the range of 40–60 psi, which is typical for ordinary residential use.

In either arrangement, pressurized water is fed into the hot water heater 12 which includes an adjustable thermostat 15 to set the water temperature in the optimum range of 200–210 degrees Fahrenheit and produces flow rate of not less than 3 gallon, per minute.

In one embodiment the hot water heater 12 includes a pre-heater unit 13 and a super-heater unit 14. The preheating and super-heating units 13 and 14 permit optimum efficiency and delivery of scalding water within a predetermined temperature range and flow rate.

Since such pre-heating and super-heating units are well known to those skilled in the art, further detailed discussion of the same is not deemed necessary.

The output from the hot water heater 12 is fed through a predetermined length of heat resistant, high pressure hose 25 to the injection probe 20 which is inserted into the lower depths of the fire ant mound 35 for eradication of the insects, particularly the queen ant.

Figure 2:
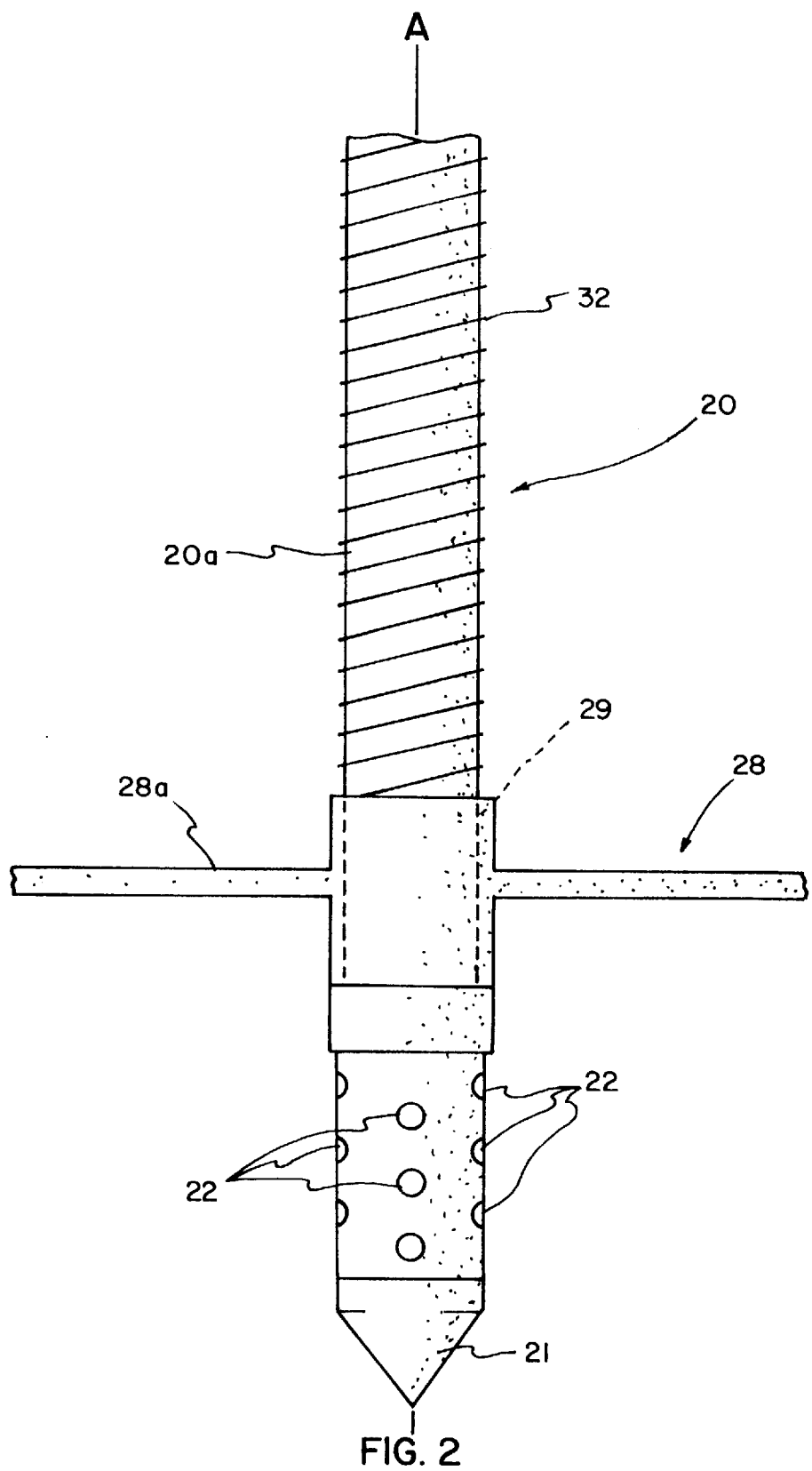
FIG. 2 is an enlarged cutaway view of the probe tip of the present invention showing the details thereof.

As more clearly shown in FIG. 2 of the drawings, the elongated, tubular probe 20 includes a conical probe tip 21 to facilitate penetration of the fire ant mound 35.

Figure 3:
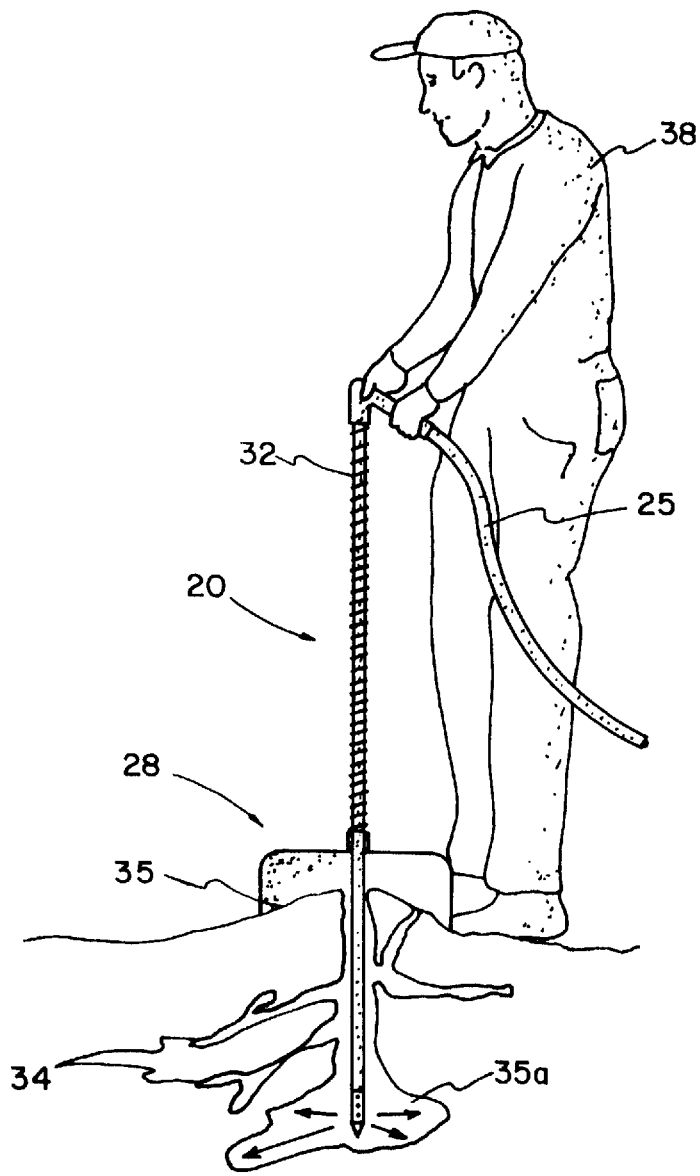
FIG. 3 is a diagrammatic view of a fire ant mound showing the injection probe inserted therein.

The tubular injection probe 20 includes a plurality of radially disposed, nozzle apertures 22 extending in perpendicular relation to a longitudinal axis A of the probe 20 for the discharge of scalding water as more clearly shown in FIG. 3.

In addition, the probe 20 is adapted for use with a generally cylindrical, capture shield indicated generally at 28, having a central opening 29 at a proximal end thereof which is adapted for sliding engagement with the probe 20 and which is spring biased downwardly when the probe 20 in its functional position below ground level.

This is accomplished by a compression spring 32 installed in functional relation with the capture shield 28 as most clearly shown in FIG. 2

Thus, the capture shield 28 functions to trap any fire ants (not shown) which emerge from the mound 35 as the probe 20 is inserted therein preventing their escape and, perhaps more importantly, protects the operator 38 of the system 10 from attack by the fire ants. In addition, the capture shield 28 retains heat and protects the operator 38 of the device from the potential backflow of hot water from the fire ant mound 35.

Figure 4:
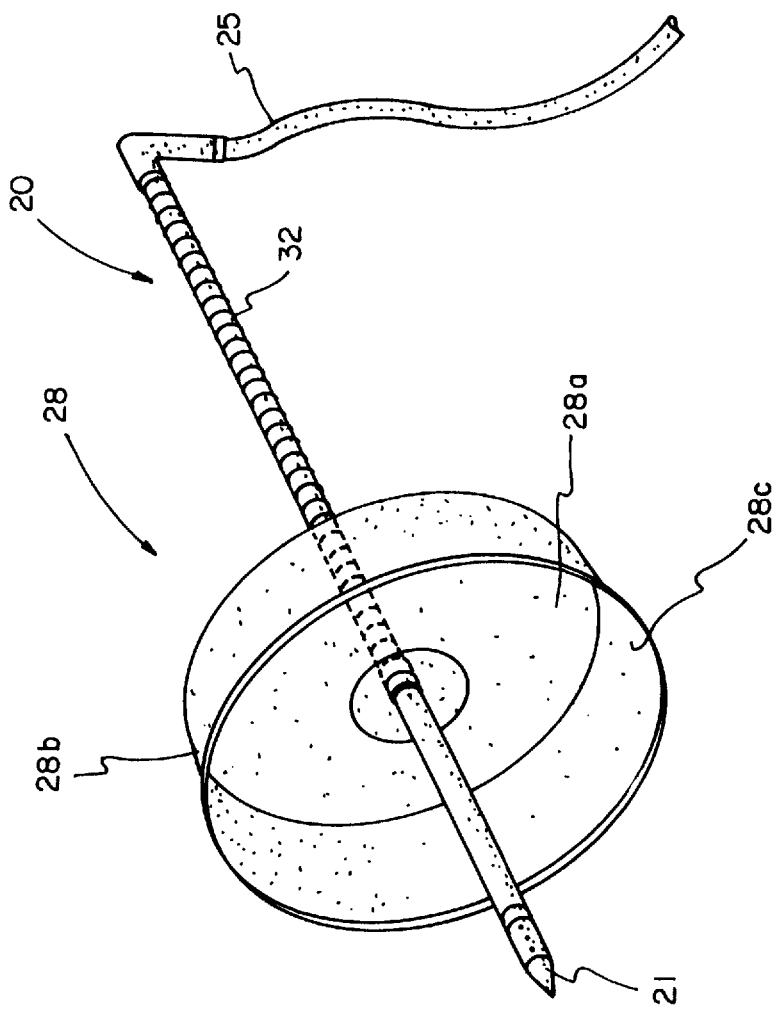
FIG. 4 is a perspective view of the injection probe showing the capture shield installed thereon.

In the preferred embodiment the capture shield 28 is generally cylindrical in configuration including a top surface 28a wherein the central opening 29 is formed and adapted for sliding engagement with the elongated, tubular body member 20a of the probe 20 as seen in FIG. 4. Shield 28 includes an integrally formed sidewall portion 28b which defines a bottom opening 28c thereof for enclosing the ant mound 35 therein.

Figure 5A:
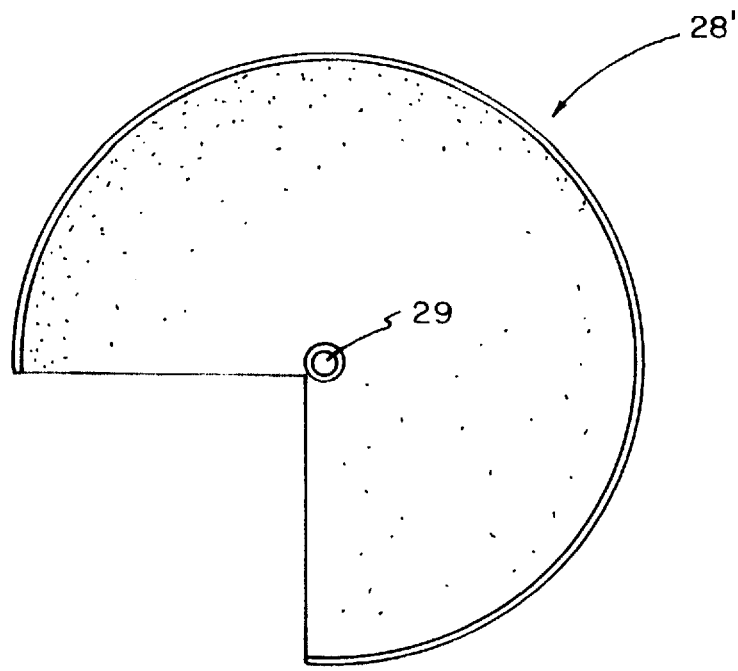
FIG. 5A is a top plan view of an alternative embodiment of the capture shield of the present invention for use adjacent the corner of a building structure.
Figure 5B:
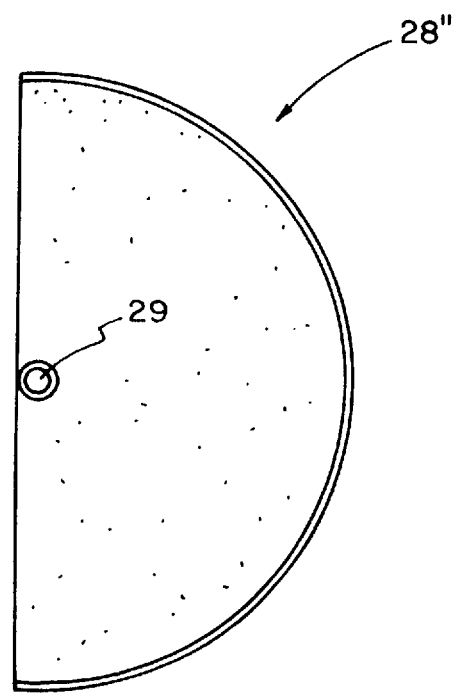
FIG. 5B is a top plan view of an alternative embodiment of the capture shield for use adjacent the foundation of a building structure.

As shown in FIG. 5A and 5B, the capture shield 28 may be provided in various alternative embodiments for adapting to the corner or side of a building structure respectively.

In the practice of the present invention, the effective eradication of the fire ant colony is carried out by inserting the injection probe 20 in a generally vertical direction toward the lowermost portion within the core region 35a of the mound 35 which includes a complex of tunnels 34 within which the queen ant (not shown) may be located. These tunnels 34 are invariably deep with the mound 35 and have been observed to be generally centrally located relative to the raised mound as illustrated in FIG. 3.

With rapid penetration, the flow of scalding water is commenced almost immediately after the probe 20 passes ground level and is continued until the probe reaches its maximum depth. Preferably, the water is heated to the range of 200–210 degrees Fahrenheit and is delivered at a rate of not less than 3 gallons per minute. The nozzle apertures 22 of the probe 20 are designed to deliver a jet of scalding water in a generally circular pattern in perpendicular relation to the vertical axis of the probe as seen in FIG. 3.

The probe 20 is then withdrawn slowly over a period of 1 to 2 minutes with hot water injection continuing at the rate of at least 3 gallons per minute.

Following the withdrawal of the probe 20 from the initial target area, the procedure may be repeated as often as deemed necessary depending on the size of the mound complex which is to be treated.

Numerous field tests utilizing this method have been conducted utilizing the time and temperature parameters described hereinabove. In each instance, an examination of the results indicated a substantial eradication of the fire ant colony assuring that the queen ant together with the supporting worker ants had been destroyed.

From the above it can be seen that the fire ant exterminating system of the present invention provides an efficient, environmentally safe method and apparatus for exterminating this formidable insect.

The extermination system is fully portable and adapted for mounting on a platform for transport to a remote site by truck, trailer, or other conveyance.

The present invention includes an injection probe which is capable of delivering scalding hot water in the range of 200–210 degrees Fahrenheit at a predetermined flow rate below ground level within a fire ant mound.

In addition, the capture shield feature of the injection probe provides an enhanced measure of safety by protecting the operator from attack by the fire ants as the treatment progress as well as from the backflow of the scalding water and potential burn injury.

The terms "top", "between", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A fire ant extermination system for probe injection of scalding water into a core region is the lower depths of a fire ant mound, said system comprising:

means for heating water to a temperature of approximately 200 degrees to 210 degrees Fahrenheit;

means for pressurizing the water in said means for heating, water to a pressure of approximately 40 to 60 pounds per square inch, injection probe means including an elongated tubular member, a conical probe having radially disposed apertures formed therein connected at one end of said tubular member and a high pressure hose connected at the other end of said tubular member to said means for pressurizing the water by a predetermined length of high pressure hose means, said tubular member having sufficient length for said conical probe to penetrate to said lower depths of said fire ant mound;

a generally cylindrical capture shield means having a height and a bottom surface radially disposed about and longitudinally slideable on said tubular member for movement between a first position adjacent said conical probe and a second position adjacent said other end of said tubular member; and spring means surrounding said tubular member for mechanically biasing said capture shield toward said conical probe and accommodating movement of said shield along said tubular member toward said second position as said injection probe, means extends beyond the bottom surface of the capture shield means by a distance at least equal to the height of the capture shield means and is inserted into the core region at the lower depths of said fire ant mound, whereby scalding water and ants are prevented from escaping during the extermination process.

2. The system of claim 1 wherein said capture shield means is configured to include a 90 degree cut out section formed therein to conform to an outside corner of a building structure whereby a fire ant mound located adjacent thereto may be injected.

3. The system of claim 1 wherein said capture shield means is configured to include a 180 degree cutout section formed therein to conform the same to a foundation wall whereby a fire ant mound located adjacent thereto may be injected.

4. The system of claim 1 wherein said probe means includes a conical probe tip formed at a terminal end thereof to facilitate insertion of the same into said fire ant mounted.

5. The system of claim 4 wherein said probe means includes a plurality of nozzle apertures formed adjacent to said terminal end thereof, said nozzle apertures being disposed in generally perpendicular relation to a longitudinal axis of said probe means at predetermined locations therein enabling said scalding water to be dispersed in a generally circular pattern within said fire ant mound.

6. The system of claim 5 wherein said nozzle apertures are formed to a predetermined size providing a flow rate of at least three gallons per minute of scalding water from said apertures.

7. The system of claim 1 wherein said means for heating the water includes a preheater unit and a super heater unit to provide optimum efficiency and fuel economy for said water heating means.

8. The system of claim 1 wherein a reserve water tank is installed in fluid communication with said means for pressurizing the heated water to provide additional capacity for said system.

9. The system of claim 1 wherein said system is mounted in balanced relation on a platform means capable of being transported on a motor vehicle to a remote location.

* * * * *

UNITED STATES PATENT AND TRADEMARK OFFICE
CERTIFICATE OF CORRECTION

PATENT: 5,870,852

DATED: Feb. 16, 1999

INVENTOR (S): William R. Stanley

It is certified that error appears in the above-identified patent and that said Letters Patent is hereby corrected as shown below:

Column 1, line 50, please change "e(termination to –extermination--.
Column 3, line 3, please change "finishes" to –furnishes--.
Column 5, line 63, please change "is" to –in--.

Signed and Sealed this

Tenth Day of August, 1999

Q. TODD DICKINSON

*Attest:*

*Attesting Officer*  Acting Commissioner of Patents and Trademarks